Patented Apr. 18, 1944

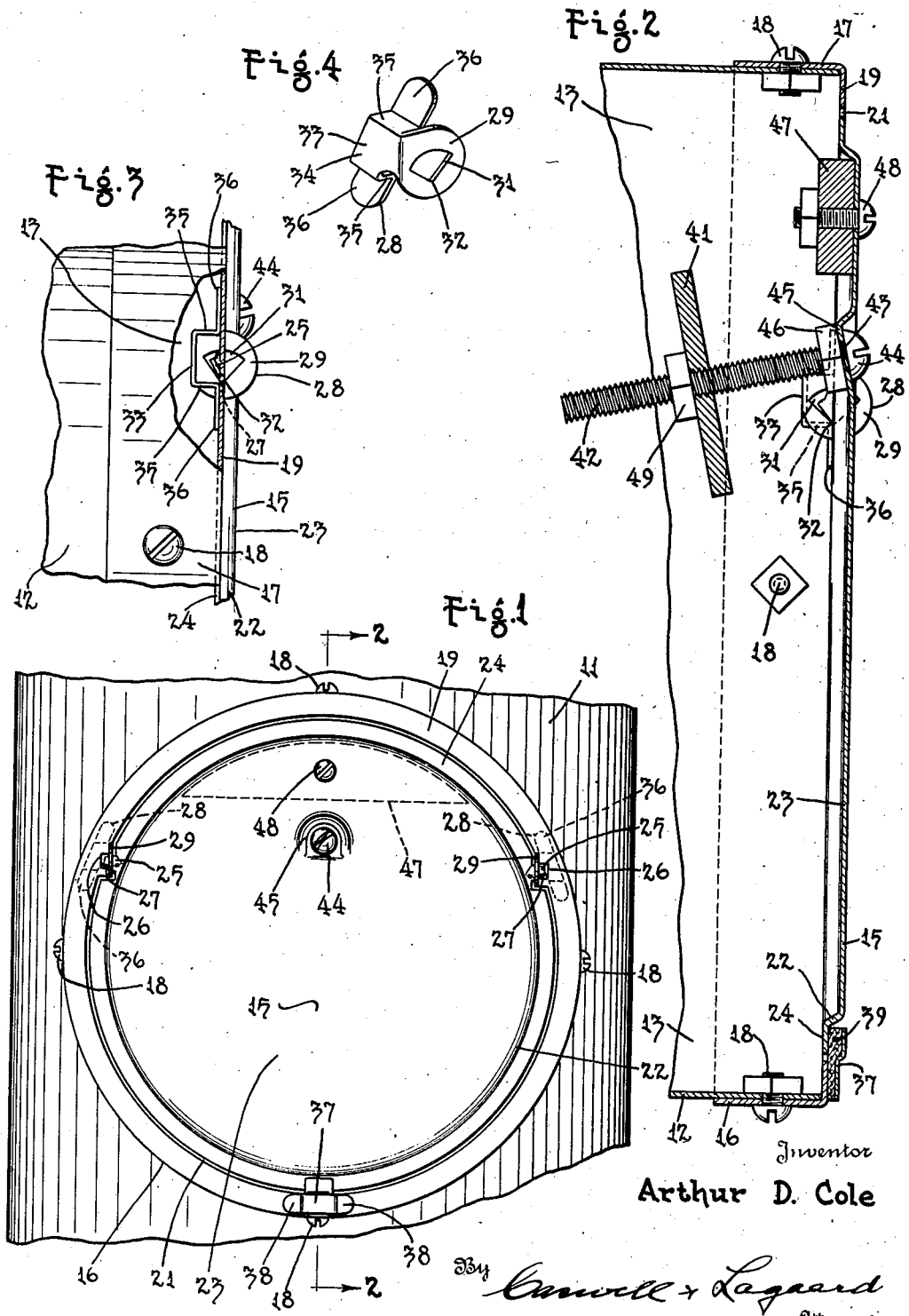

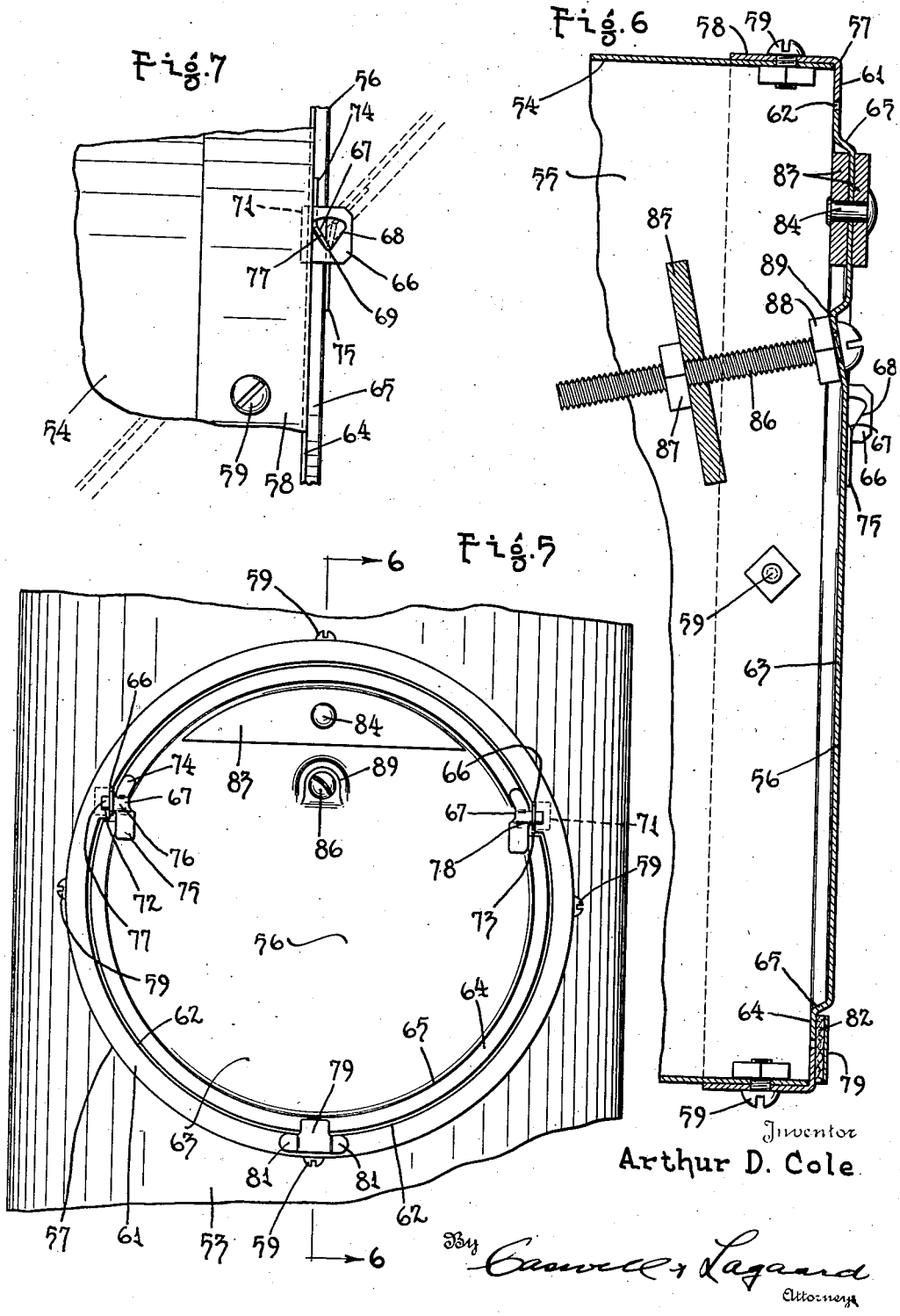

2,346,825

UNITED STATES PATENT OFFICE 2,346,825

DRAFT REGULATOR

Arthur D. Cole, Minneapolis, Minn.

Application December 5, 1941, Serial No. 421,830

6 Claims. (Cl. 236—45)

My invention relates to draft regulators and has for an object to provide an extremely sensitive draft regulator.

Another object of the invention resides in providing a draft regulator having a pivoted damper and in constructing the pivot means for the damper so as to afford a minimum amount of friction.

An object of the invention resides in constructing the pivot means with knife edges for supporting the damper.

Another object of the invention resides in constructing the frame and damper with juxtaposed parts and in constructing one of said parts with a projection and the other with a notch for the reception of said projection and in attaching the bearing of the pivot means for the damper to said projection.

A feature of the invention resides in constructing the frame of the draft regulator from sheet metal and in forming the damper from the central portion of the sheet from which the frame is constructed.

Another object of the invention resides in constructing either the damper or the frame with knife edges struck out of the portion of the metal from which the other is formed to leave a notch therein and in providing a bearing overlying said notch.

A still further object of the invention resides in the specific construction of pivot means used with the damper.

Other objects of the invention reside in the novel combination and arrangement of parts and in the details of construction hereinafter illustrated and/or described.

In the drawings:

Fig. 1 is a front elevational view of a smoke pipe and a draft regulator illustrating an embodiment of my invention.

Fig. 2 is an elevational sectional view taken on line 2—2 of Fig. 1 and drawn to a greater scale.

Fig. 3 is a fragmentary side elevational view of a portion of the structure shown in Fig. 1 with parts thereof cut away to illustrate the interior construction of the pivot means.

Fig. 4 is a perspective view of one of the bearings of the invention.

Fig. 5 is a view similar to Fig. 1 of a modification of the invention.

Fig. 6 is a fragmentary elevational sectional view taken on line 6—6 of Fig. 5.

Fig. 7 is a fragmentary elevational view of a portion of the structure shown in Fig. 6 and illustrating the pivot means for the damper.

For the purpose of illustrating my invention, I have shown in Figs. 1 and 2 a portion of a vertically extending smoke pipe 11 which is circular in form and which has connected to it a branch pipe or conduit 12. This branch pipe has a passageway 13 in it communicating with the interior of the smoke pipe 11. The branch pipe 12 is open at its outer end and may be closed by means of a damper 15 which is mounted for swinging movement in a frame 16. These parts will now be described in detail.

The frame 16 comprises a tubular portion 17 which fits about the exterior of the branch pipe 12 at the open end thereof. A number of bolts 18 extend through the tubular portion 17 and the pipe 12 and hold the frame 16 attached to the said pipe. The outermost end of the tubular portion 17 is formed with an inturned flange 19 which provides an opening 21 in the frame 16 communicating with the passageway 13 in pipe 12.

In the construction of the frame 16, a sheet of metal is employed which is stamped to form the tubular portion 17. From the central portion of this sheet is struck out the damper 15 which is circular in form and which is adapted to close the opening 21. The damper 15 is constructed with an offset 22 which provides a central portion 23 and a marginal portion 24 extending about the same. Due to the offset 22, the metal forming the marginal portion 24 is drawn toward the center of the damper and the external diameter of the damper 15 is somewhat reduced with reference to the diameter of the opening 21 in flange 19, so that the damper fits freely within said opening. In the construction of the damper 15, two ears 25 are formed thereon, which project outwardly beyond the edge of said damper and which serve as trunnions. Due to the projection of the trunnions 25 beyond the edge of the damper, notches 26 are formed in the flange 19 of frame 16 at the locality of said ears. The trunnions 25 are bent rearwardly at an angle, as best shown in Fig. 3 and are sharpened at their lowermost edges as designated at 27 to form knife edges.

The knife edges of the trunnions 25 are supported for pivotal movement in bearings 28, which are attached to the flange 19 of frame 16 opposite the notches 26 therein. One of these bearings is illustrated in detail in Fig. 4. This bearing consists of a body portion 29 formed with a segmental shaped opening 31 therein which is constructed with a crotch 32 forming the support for the knife edge 27 of the damper 15. This body portion 29 has connected to it a box 33 formed with a back 34 and end walls 35 connected therewith. The end walls 35 have issuing from them base members 36 which are adapted to rest upon the flange 19 of frame 16, and which are secured thereto, by means of welding or otherwise. The bearings 28 are so positioned that the body portions 29 thereof are parallel with one another and so that the box 33 overlies the notch 26. When applied, the body portion 29 projects outwardly beyond the outer surface of the flange 19 with the crotch 32 of the opening 31 substantially at the plane of the damper proper. The disposition of the bearings 28 is such that the two ears 25 are received in the openings 31 therein and so that the knife edges 27 thereof engage the crotches 32. By means of this construction, the damper is pivoted for swinging movement with a minimum amount of friction and is free from the edges of the opening 21 of flange 19.

Movement of the damper 15 is limited at the closing position of the damper by means of a stop 37 which is formed with two lugs 38 secured to the flange 19 by welding or otherwise. This stop has a cushioning pad 39 secured thereto which directly engages the marginal portion 24 of damper 15 and thereby eliminates noise and cushions the action of the damper.

The axes of the two trunnions 25 are disposed above the center of gravity of the damper proper, so that the center of gravity of the damper is below the same. The weight of the damper 15 is partly counterbalanced by means of a segmental-shaped weight 47 which is disposed upon the interior of the damper at the upper portion of the same and in proximity to the offset 22. This weight is attached to the damper by means of a bolt 48 which extends through the said damper and weight.

For controlling the action of the damper, a weight 41 is threaded upon a screw 42 secured to the central portion 23 of the damper 15 and projecting inwardly into the passageway 13 of pipe 12. The screw 42 passes through an opening 43 in the central portion 23 of damper 15 and the head 44 thereof is seated against an offset 45 formed in the damper. A nut 46 engaging the offset 45 serves to hold the screw rigidly in position. I have found that the action of the weight 41 is most satisfactory when the screw 42 is arranged in inclined position as shown in Fig. 2. To accomplish this purpose, the offset 45 of the damper 15 through which the screw 42 extends is arranged in inclined relation with respect to the central portion 23 of the damper. The weight 41 is held in position by means of a lock nut 49 also threaded on the screw 42.

The use of the invention is obvious. When my draft regulator is mounted on a smoke pipe, as illustrated in Figs. 1 and 2, excess suction in the smoke pipe draws the damper 15 inwardly, whereby air from the room in which the pipe is located, passes through the passageway 13 in branch pipe 12 and into the passageway in the smoke pipe 11, thus maintaining uniform suction in the smoke pipe at the furnace or heater. By adjusting the weight 41 on the screw 42, the pressure at which the regulator operates may be varied.

In Figs. 5, 6 and 7, I have shown a modification of the invention. For the purpose of illustrating this form of the invention, a vertically extending smoke pipe 53 has been shown, which has connected to it a branch pipe 54 having a passage 55 therein, which communicates with the passageway in the pipe 53. The branch pipe 54 is open at its end and is adapted to be closed by means of a damper 56 which is mounted for swinging movement in a frame 57. These parts will now be described in detail.

The frame 57 consists of a sleeve 58 which is adapted to fit about the exterior of the branch pipe 54 and which may be attached thereto by means of a number of bolts 59. This frame is constructed with an inwardly turned flange 61 which has a central opening 62 therein preferably circular in form.

The damper 56 is circular in form and has a central portion 63 and a marginal portion 64 extending about the same. The marginal portion 64 is offset with reference to the central portion 63 and is connected thereto as indicated at 65. The diameter of the marginal portion 64 is slightly less than the opening 62 in the flange 61, so that the damper may swing freely with reference to the frame 57. The damper 56 and frame 57 are constructed in the same manner as in the other form of the invention.

The damper 56 is provided with pivot means, the axis of which is disposed above the center of the said damper and lies in a substantially horizontal position. This pivot means includes two bearings 66 which are attached to the flange 61 of frame 57 and two trunnions 67 cooperating therewith. The bearings 66 are formed from sheet metal and have segmental-shaped openings therein indicated at 68 and which are formed at the apexes thereof with crotches 69. These bearings have bases 71 extending therefrom. At the locality of attachment of bearings 66 to the flange 61 of frame 57, said frame is provided with projections 72 which are adapted to extend into notches 73 formed in the marginal portion 64 of the damper 56. The bases of the two bearings 66 are welded or otherwise secured to the flange 61 at the locality of the projection 72, whereby the bearings 66 may be arranged at right angles to the axis of the said pivot means for the damper and at the edges of the said projections.

Inasmuch as both of the trunnions 67 are identical, only one thereof will be described. This trunnion is constructed from sheet metal and is bent to form two ears 74 and 75 and a body portion 76 therebetween. The two ears 74 are offset with reference to one another and the body portion of the said trunnion is disposed in inclined relation therebetween. Issuing outwardly from the body portion 76 is a knife edge 77 which is arranged in coplanar relation with respect to the body portion 76. The ear 74 is attached to the marginal portion 64 of damper 56 above the notch 73 therein, while the ear 75 is attached to the central portion 63 of said damper. This may be accomplished by welding or otherwise and the parts are arranged so that the two knife edges 77 lie in alignment with the axis of the pivot means. These knife edges extend through the opening 68 in the bearings 66 and engage the crotches 69 of said bearings. Shoulders 78 formed on the body portions 76 of the two trunnions 67 engage the bearings 66 below the crotches 69 and limit axial movement of the damper, thereby holding the damper out of engagement with the edges of the flange 61 at the opening 62.

Movement of the damper 56 is limited at the closing position of the damper by means of a stop 79 which is formed with two lugs 81 secured to the flange 61 by welding or otherwise. This stop has a cushioning member 82 secured thereto which directly engages the marginal portion 64 of damper 56 and thereby eliminates noise and cushions the action of the damper.

The weight of the damper 56 below the axis of the pivot means is partly counter-balanced by means of a number of weights 83 which are held attached to the upper portion of the damper by means of a rivet or bolt 84. If desired, these counter-weights may be placed one on each side of the central portion 63 of the damper or entirely within the draft regulator.

For controlling the action of the damper, a weight 85 is employed which is threaded to receive a screw 86. A lock nut 87 is also screwed upon the same screw to hold the weight 85 in adjusted position thereon. The screw 86 extends through the central portion 63 of damper 56 above the axis of the pivot means thereof and is held attached to said damper by means of a nut 88. The screw 86 in this form of the invention is arranged in inclined position, as shown in Fig. 6. To accommodate this, the portion 89 of the damper 56 through which the screw 86 extends is offset inwardly and is inclined relative to the central portion of the damper as best shown in Fig. 6.

The operation of this form of the invention is similar to the operation of the other form of the invention. By adjusting the position of the weight 85 on the screw 86, the action of the device may be varied to maintain any degree of suction desired at the heater.

The advantages of my invention are manifest. By means of the particular type of pivot employed, an extremely small amount of friction is encountered, making the device highly sensitive. By the construction employed, a single sheet of material serves to make both the frame and the damper. The notches formed in the frame by the construction of the trunnions receive the trunnions when the damper is in operative position and are closed by the box on the bearings in which the trunnions are pivoted. With my device, there are no complicated parts to get out of order and heat and soot will not readily affect the operation of the device.

Changes in the specific form of my invention, as herein described, may be made within the scope of what is claimed without departing from the spirit of my invention.

Having described my invention, what I claim as new and desire to protect by Letters Patent is:

1. In a draft regulator, a frame constructed from sheet metal and having an opening therein, a damper struck out of the sheet metal and forming said opening, an ear formed on said damper and projecting outwardly beyond the edge thereof, said ear leaving a notch in said frame, said ear having a knife edge, a bearing secured to said frame and having a crotch engaged by said knife edge, said bearing having a part overlying said notch.

2. In a draft regulator, a frame constructed from sheet metal and having an opening therein, a damper struck out of the sheet metal and forming said opening, an ear formed on said damper and projecting outwardly beyond the edge thereof, said ear leaving a notch in said frame, said ear having a knife edge, a bearing secured to said frame and having a crotch engaged by said knife edge, said bearing being constructed with a box overlying said notch.

3. In a draft regulator, a frame having a substantially planiform portion formed with an opening therein, a damper struck out of the planiform portion of the damper and forming said opening, said damper having an ear projecting outwardly therefrom, and forming in the frame a notch, said ear being constructed with a knife edge disposed substantially in the plane of the damper and a bearing having a crotch arranged with its apex substantially in the plane of the planiform portion of the frame and at said notch, said knife edge engaging said crotch and means on said bearing for covering said notch.

4. In a draft regulator, a frame for attachment to a duct having a passageway therein, said frame comprising a part extending transversely of the passageway and having a substantially circular opening therein, a substantially circular damper for closing said opening, said damper having a central portion and a marginal portion offset therefrom, said denoted part of the frame and said damper having juxtaposed marginal portions, pivot means for the damper extending transversely thereof and disposed with its axis on one side of the center of the damper, the marginal portion of said frame at the axis of said pivot means having a projection thereon, formed with an edge extending at right angles to the axis of said pivot means, a bearing extending outwardly from said projection at said edge, said marginal portion of the damper having a notch for the reception of the projection of said frame, a trunnion comprising a body portion having two ears extending therefrom, said ears being offset from one another and the body portion thereof extending obliquely therebetween, one of said ears being attached to the marginal portion of the damper and the other of said ears to the central portion thereof, said trunnion including a knife edge extending outwardly from said body and disposed in the plane thereof, said bearing having an opening therein formed with a crotch for the reception of said knife edge.

5. In a draft regulator, a frame for attachment to a conduit having a passageway therein, said frame having a part extending transversely of the passageway and formed with a substantially circular opening therein, a substantially circular damper for closing said opening, pivot means for the damper extending transversely thereof and having its axis disposed on one side of the center of the damper, said damper and frame having juxtaposed marginal portions, a projection formed on one of said portions and having an edge disposed at right angles to the axis of said pivot means, a notch in the other of said marginal portions for the reception of said projection, an angular shaped bearing having the edge of said projection received within the bight thereof and attached to said marginal portion, and means carried by the other marginal portion at the vicinity of said notch for engagement with said bearing.

6. In a draft regulator, a frame having a substantially planiform portion formed with an opening therein, a damper struck out of the planiform portion of the damper and forming said opening, said damper having an ear projecting outwardly therefrom, and forming in the frame a notch, said ear being constructed with a knife edge disposed substantially in the plane of the damper, a bearing having converging edges forming a crotch arranged with its apex substantially in the plane of the planiform portion of the frame and at said notch, said knife edge engaging said crotch, said ears being twisted to cause the same to lie in proximity to one of said edges when the damper is in closing position, said ear moving toward the other edge of the crotch when the damper is moved toward opening position and means on said bearing for covering said notch.

ARTHUR D. COLE.